United States Patent [19]

Wild

[11] 3,982,578
[45] Sept. 28, 1976

[54] PNEUMATIC TIRES
[75] Inventor: Hiram Leslie Wild, Sutton Coldfield, England
[73] Assignee: Dunlop Limited, London, England
[22] Filed: June 18, 1974
[21] Appl. No.: 480,387

[30] Foreign Application Priority Data
June 26, 1973  United Kingdom............ 30256/73

[52] U.S. Cl. .............................................. 152/358
[51] Int. Cl.² ........................................... B60C 9/18
[58] Field of Search............ 152/358, 362 R, 353, 152/354.5, 355, 361, 354, 357

[56] References Cited
UNITED STATES PATENTS

| | | | |
|---|---|---|---|
| 1,395,686 | 11/1921 | Lindley | 152/358 |
| 2,184,326 | 12/1939 | Thomas | 152/358 |
| 2,257,604 | 9/1941 | Harrah | 152/358 |
| 2,257,647 | 9/1941 | Pierce | 152/358 |
| 2,258,031 | 10/1941 | Pierce | 152/358 |
| 3,299,935 | 1/1967 | Bush | 152/361 X |
| 3,895,665 | 7/1975 | Heling et al. | 152/357 |

Primary Examiner—Allen N. Knowles
Assistant Examiner—Hadd Lane
Attorney, Agent, or Firm—Stevens, Davis, Miller & Mosher

[57] ABSTRACT

A pneumatic tire comprises a reinforcing layer including at least one metal wire felt. The felt comprises a mat of crimped continuous metal wires intermingled in three dimensions. The layer may comprise a tread reinforcement, breaker layers, sidewall reinforcements and various types of bead reinforcements.

26 Claims, 10 Drawing Figures

PNEUMATIC TIRES

This invention relates to pneumatic tires.

According to the invention, a pneumatic tire having a tread portion and sidewall portions comprises a reinforcing layer including at least one metal wire felt, the felt comprising a mat of interpenetrated substantially aligned crimped continuous metal wires or bunches of wires, the interpenetration of the wires being in the nature of an intermingling in three dimensions produced by laying the crimped wires or bunches of wires under tension and substantially relaxing the tension.

The crimping of wires or bunches of wires for use in the felt included in the reinforcing layer of the present invention may be achieved in a number of ways; for example, by false twisting, i.e., twist the wire or bunch of wires, stabilize the twist by, e.g., passing through a series of rollers and remove the twist; by stuffer box treatment i.e. by feeding the wires or bunches of wires into a chamber having a smaller exit than inlet thereby crushing the wires; by gear crimping in which the wires are passed between fluted rollers; and by edge crimping in which the fibers are drawn over an edge. Such felts have been described in the assignee's U.S. Pat. No. 3,235,935 and in the assignee's U.S. application Ser. No. 480,388 filed June 18, 1974, now U.S. Pat. No. 3,892,376 of July 1, 1975.

Preferably, the metal wire is steel wire, the diameter of the individual wires in the felt is between 0.04 mm and 0.71 mm. The wires may be brass or zinc plated.

The cross-section of the wires in the felt need not be circular but the cross-sectional area of such wires is preferably equivalent to the cross-sectional area of a circular wire having a diameter in the range 0.04 mm to 0.71 mm.

The bunches of wires may form twisted strands, which in turn may be twisted together to form cords, the strands or cords then being crimped.

The felt may be consolidated by needling with a barbed needle.

Preferably the metal wire felt is rubberized prior to inclusion into the tire. The felt may be rubberised by the hot or cold calendering of the rubber material onto the felt or by injection moulding of the rubber material onto the felt. Preferably the weight of wire in a felt covered with rubber material is no greater than 80%.

The reinforcement may comprise breaker layers, sidewall reinforcements, tread reinforcements, between ply reinforcement and bead filler and chafer strips.

It has been found that the felt is particularly useful as a tread reinforcement in a winter tire for improving the traction qualities of such tires in snow or icy conditions. The felt can be included in the tread without any tread pattern being moulded therein. Preferably however, a tread pattern comprising large blocks or ribs having little or no secondary grooving or slotting therein may be moulded directly into the tread portion incorporating the felt, the felt remaining adjacent the ground-contacting surface of the ribs or blocks.

The invention will be further described by way of example only with reference to the accompanying informal drawings of which:

Figure 1:
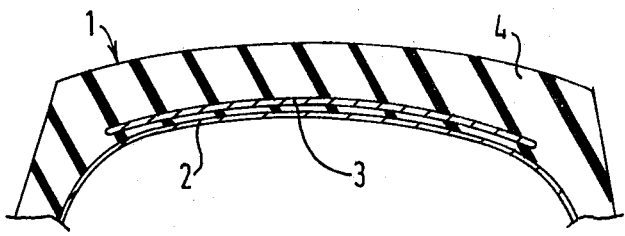
FIG. 1 shows a transverse cross-section of a tread portion of a tire according to a first embodiment of the invention.

Referring to FIG. 1, a pneumatic tire 1 has a carcass 2 of at least one textile cord fabric ply and may be of either radial - or cross-ply construction. The tire 1 is provided with a reinforcing layer comprising at least one breaker layer 3 of rubberized metal wire felt. The felt provides breaker layers of higher modulus than the hitherto used textile breaker layers thereby allowing a reduction of the number of layers required for a given tire construction. Additionally, the felt layers provide greater protection against damage than the textile breaker layers; and cause tires to exhibit cooler running properties.

In cross-ply tires of low profile, e.g. 60% aspect ratio, to build the tire it is necessary to have very low cord angles in the crown region of the tire which creates difficulties in the manufacture of such tires. This problem can be alleviated by the provision of a restraining member, e.g. breaker layer 3, and not using such low cord angles.

Although the tread 4 of the tire 1 has been shown without any tread pattern therein, any deisred pattern can be moulded into tread 4.

Figure 2:
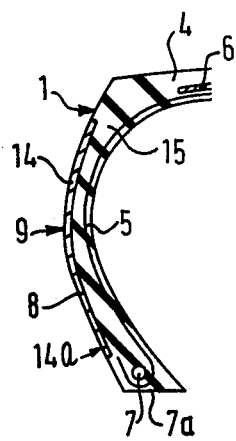
FIGS. 2, 3 and 4 show a transverse cross-section of a tire sidewall according to variations of a second embodiment of the invention.
Figure 3:
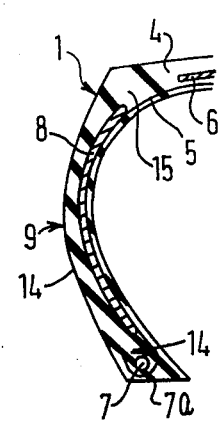
Figure 4:
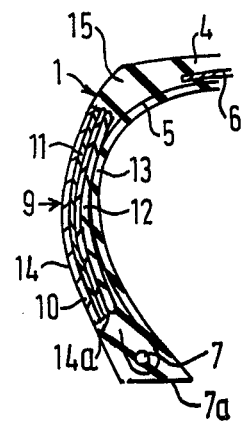

In the second embodiment, shown in FIGS. 2, 3 and 4, the pneumatic tire 1 may have a carcass of textile cord fabric in cross-ply construction or may have a carcass of textile or steel cord fabric in radial ply construction. The particular carcass construction shown comprises a single carcass ply 5 disposed radially of the tire, a breaker layer 6 being provided in the tread portion 4. The carcass ply 6 is turned around tire beads 7.

In the variant shown in FIG. 2 of the second embodiment, the tire 1 is provided with a single sidewall reinforcing layer 8 of rubberized metal wire felt. The layer 8 forms the surface 14 of the sidewall 9 and is disposed radially outwardly of the carcass ply 5.

In the variant shown in FIG. 3, the sidewall reinforcing layer 8 is disposed adjacent to and immediately radially outwardly of the carcass ply 5 in the sidewall 9 of the tire 1.

In the variant shown in FIG. 4, several felt layers, e.g. 10, 11, 12 and 13 are disposed in the sidewall 9 of the tire 1 to form substantially the whole of the sidewall 9 between the carcass ply 5 and the radially outer surface 14 thereof. Alternatively, the layers 10 to 13 may be replaced by a single folded layer.

The layers 8, 10 to 13 extend radially inwardly from the shoulder region 15 of the tire 1 to a point 14a, which point 14a lies radially outwardly of the bead base 7a by an amount substantially equal to the radial extent of a rim flange of a wheel on which the tire is mounted during use. Alternatively, the layers may extend only a short distance either side of the widest point of the tire, i.e. the point at which maximum deflection occurs, and therefore at which maximum damage is likely to occur.

The reinforcing layer(s) of rubberized metal wire felt in the sidewall of the tires provide a damage resistant layer which will help to prolong the life of a tire liable to sidewall damage such as an off-the-road tire. Additionally, the layer(s) modify the deflection characteristics of the sidewalls to reduce deflection of the sidewalls during use of the tire whereby damage is less likely to occur.

Figure 5:
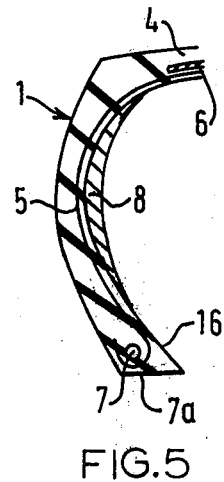
FIG. 5 shows a transverse cross-section similar to FIG. 2 of a modification of the second embodiment.

In a modification of the second embodiment, shown in FIG. 5, the layer 8 is located on the inner surface 16 of the tire 1.

Figure 6:
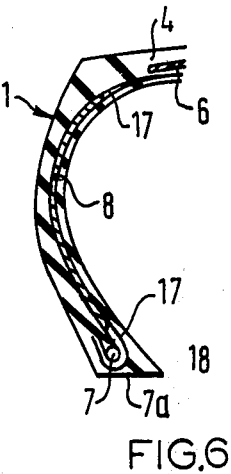
FIG. 6 shows a similar view of FIG. 5 of a second modification of the second embodiment.

In the second modification shown in FIG. 6 a reinforcing layer 8 of the felt is positioned between the carcass plies 17,18 of a tire having at least two carcass plies of textile cord fabric in radial- or cross-ply construction. The higher modulus of the layer 8 as compared to conventional rubber ply separation layers reduces sidewall deflection during use of the tire and also provides better protection against damage. In an alternative construction, not shown, particularly in connection with cross-ply tires, a layer 8 between the carcass plies extending over the crown region of the tire 1 may be used, the layer 8 thereby providing protection against damage in the crown region also.

Figure 7:
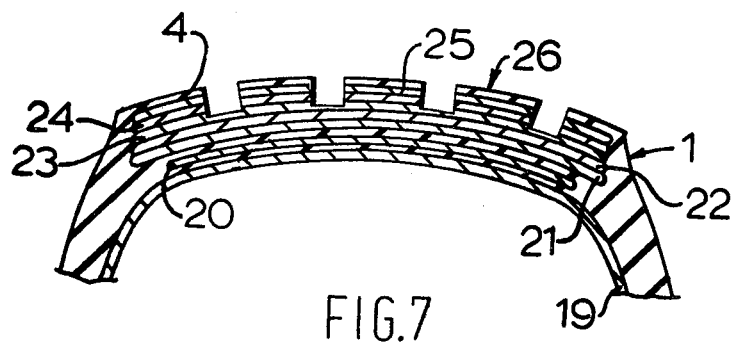
FIG. 7 shows a transverse cross-section of a tread portion of a tire according to a third embodiment of the invention.

In the embodiment shown in FIG. 7 a reinforcing layer of metal wire felt comprises tread reinforcing layer. The tire 1 has a radial- or cross-ply carcass 19 and can have a breaker layer 20 either similar to layer 3 in FIG. 1 or of conventional construction. The tread 4 of the tire 1 is provided with a reinforcing layer consisting of substantially circumferential layers 21–25 of metal wire felt extending substantially over the whole of the axial width of the tread 4 and disposed immediately radially inwardly of the ground-contacting surfaces 26. The layers 21–25 improve wear and damage resistance and improve the traction qualities of the tread 4. The reinforcing layers of felt, 21–25, can be used in addition to a steel breaker layer of a radial ply tire or can be used in addition to, or replace the textile or steel breaker layers of a cross-ply tire. Alternatively, the layers 21–25 can be replaced by a single layer of felt of suitable thickness.

In an alternative construction, not shown, the tread 4 of the tire is provided with at least one groove, the reinforcing layer comprising at least two groups of a plurality of layers of felt of a width substantially equal to the width of ribs formed by said groove, one group being disposed in each rib and being located immediately radially inwardly of the ground-contacting surface of the tread 4. The radially innermost of the layers of felt in each rib being at the same radial height as the base of the groove. Alternatively, each group may comprise a single layer of felt of suitable thickness. A further reinforcing layer consisting of at least one layer of felt of a width substantially equal to the width of the tread may be provided radially inwardly of the base of the groove. In a further alternative, in tires having large block or rib tread patterns with little or no secondary groove or slotting therein it is possible to incorporate the felt and mould the pattern therein, the felt remaining adjacent the ground-contacting surface of the blocks or ribs.

Figure 8:
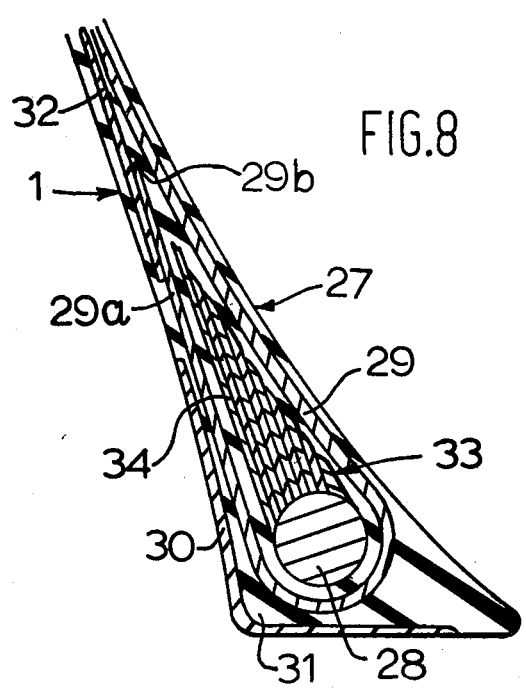
FIG. 8 shows a transverse cross-section of a tire bead region according to fourth, fifth and sixth embodiments of the invention.

Referring to FIG. 8, the bead region 27 of the tire 1 is provided with a bead wire 28. The tire 1 has at least one carcass ply 29 having a ply turn-up 29a turned around the bead wire 28.

In the fourth embodiment the bead region 27 is also provided with a reinforcing layer comprising a chafer strip 30 of metal wire felt located around the bead heel 31. Such a chafer strip 30 has greater wear resistance than the conventional hard rubber or textile fabric chafer strips.

In the fifth embodiment, the reinforcing strip comprises a bead filler 32 of metal wire felt, the filler 32 being located either axially inwardly of or axially outwardly of (as shown) the ply turn-up 29a. The filler 32 extends radially inwardly and outwardly of the end 29b of the turn-up 29a to act as a ply extension strip. The flexibility of the felt used in the filler tends to reduce the problem of failure of the tire due to the abrupt change in stiffness at the ply end 29b. In an alternative construction, not shown, the filler 32 is extended radially inwardly and turned around the bead wire 28.

In the sixth embodiment, the reinforcing layer comprises a plurality of strips of felt of varying width forming a bead apex component 33. In the construction shown the strips of felt decrease progressively in width from strip 34 forming one side of the apex 33. In an alternative construction, not shown, the strips may progressively decrease in width on either side of a central strip extending from the base to the tip of the apex 33. In a further alternative construction the plurality of strips may be formed by folding a single strip of felt of a width sufficient to form the apex 33. The felt is stiffer than the conventional hard rubber apices.

It is preferred that an apex 33 is used in conjunction with the filler 32 to offset the increase in flexibility of the filler 32 over coventional steel cord fillers with the increase in stiffness of the apex 33. However, it will be appreciated that the three embodiments all shown in FIG. 8 need not necessarily be always used together.

In the constructions described above the felt is preferably rubberized prior to incorporation into the tire.

Additionally, when a reiforcing layer comprising metal wire felt is used, particularly when replacing steel cord fabric, e.g. filler strips, in the tire problems associated with the cut edge of the fabric are reduced or obviated. The problems comprise failure due to the cut edge damage the rubber of the tire on flexing during use thereof, this being aggravated by the ends of the cut cords not being brass or zinc plated resulting in no bond or only a week bond between the rubber and the steel. The felts, being made to the appropriate width, do not have cut edges and the wires are also brass or zinc plated resulting in a good bond between the rubber and the wires.

The invention will now be described further with reference to the following examples.

EXAMPLE I

In order to show the improvement in traction obtained using felt as a tread reinforcement in, for example, winter tires, five 2.25-8 model tires were prepared (A,B,C,D, and E). The tires each had the same tread compound but tires B to E also incorporated different felts, details being given in Table I. The tires each comprised two carcass plies arranged in cross-ply configuration.

TABLE I

| Tire | Wire diameter in felt (mm) | Measure of felt density (kg/m$^2$) |
|---|---|---|
| A | — | — |
| B | 0.15 | 0.85 |
| C | 0.18 | 1.4 |
| D | 0.22 | 1.66 |

TABLE I-continued

| Tire | Wire diameter in felt (mm) | Measure of felt density (kg/m²) |
|---|---|---|
| E | 0.23 | 2.02 |

The felts were each needled felts and were formed into a tread strip by being located between the inner two strips of four strips of tread rubber compound of approximately 0.8 mm thickness, the resultant thickness of the tread strip being approximately 4 mm.

Prior to testing to determine the friction developed on ice, the tires were each subject to abrasion by use on a trailer to simulate the tread surface which results from normal tire surface. Each tire was then cut into sections and three sections of each tire were attached to a loaded plate and pulled across an ice surface at 1 cm/sec. under a load of 45N. The friction values developed under these conditions are given to Table II. Friction on ice is critically dependent on the surface temperature of the ice which cannot easily be controlled. The temperature of the ice was −5°C. but this is the temperature of the bulk rather than the ice surface.

TABLE II

| Tire | Co-efficient of Friction | |
|---|---|---|
|  | Initial | Sliding |
| A | 0.35 | 0.28 |
| B | 0.99 | 0.46 |
| C | 1.27 | 0.70 |
| D | 1.06 | 0.66 |
| E | 1.13 | 0.52 |

The above test is considered to be a realistic laboratory test even though the contact pressure is lower than would develop in service. The tires B to E, after abrasion, each had a large number of projecting wires even though calendering tends to orientate the coils of the felt in the plane of the tread strip. This resulted in the ice being scored by the passage of the tire sections and a pronounced stick-slip process developed making it difficult to induce steady sliding. For this reason the apparent differences in friction between tires B to E should be treated with reserve. However, it is clear from the test that tires incorporating the felt give a considerably improved grip over the tire without the felt.

EXAMPLES II

Three further 2.25–8 model tires (F, G and H) were prepared as for Example I including abrasion prior to testing. Details are given in Table III.

TABLE III

| Tire | Wire diameter in felt (mm) | Measure of density of felt (kg/m²) |
|---|---|---|
| F | — | — |
| G | 0.18 | 0.76 |
| H | 0.18 | 1.20 |

These tires were tested on an ice-rink by being fitted to a trailer and pulled around the rink and subjected to braking. Results were variable due to differences in ice surface temperature across the ice but average braking coefficients were obtained at ice surface temperatures of approximately −0.5° and −2.5°C. and typical values are given in Table IV.

TABLE IV

| Tire | Braking −0.5°C. | | Co-efficient −2.5°C. | |
|---|---|---|---|---|
|  | Peak | Slide | Peak | Slide |
| F | 0.085 | 0.019 | 0.209 | 0.047 |
| G | 0.113 | 0.038 | 0.216 | 0.044 |
| H | 0.083 | 0.024 | 0.195 | 0.044 |

Although no improvement is observed on the colder ice some improvement is apparent on the ice at near melting point, particularly for the sliding values.

EXAMPLES III

Nine further 2.25–8 model tires (I to Q) were prepared as for Example I including abrasion prior to testing. The tires I to L were made using one type of tread compound and the tires M to Q using a second type of tread compound. Details of the felts used are given in Table V.

TABLE V

| Tire | Wire diameter in felt (mm) | Measure of density of felt (kg/m²) |
|---|---|---|
| I | — | — |
| J | 0.22 | 0.76 |
| K | 0.22 | 1.00 |
| L | 0.22 | 1.20 |
| M | — | — |
| N | 0.176 | 1.6 |
| O | 0.22 | 2.0 |
| P | 0.38 | 2.1 |
| Q | 4 × 0.25(lay 8.5 mm S) | 3.3 |

These tires were tested by mounting on a trailer and using an electric motor to slowly rotate the trailer wheels against the inertia of a vehicle and determining the coefficient of friction. It was found that a "stick-slip" process developed before initially giving a series of pulses of high friction before a steady sliding state is achieved. The tires containing felt produced pulses of substantially equal height up to steady sliding whereas with the tires without felt in the tread the heights of successive pulses decreased quite rapidly.

Table VI shows the average co-efficients of friction determined for the tires both in the "stick-slip" and the steady slide conditions. The co-efficients are averages of six tests on each tire, five pulses being counted for the pulse figure given. The co-efficients are given as compared to the tires not having felt in the tread.

TABLE VI

| Tire | Co-efficient of Friction | |
|---|---|---|
|  | Pulse | Steady Sliding |
| I | 100 | 100 |
| J | 128 | 247 |
| K | 126 | 242 |
| L | 140 | 240 |
| M | 100 | 100 |
| N | 125 | 322 |
| O | 132 | 228 |
| P | 114 | 223 |
| Q | 119 | 283 |

As can be seen the use of felt in tire treads gives a 10–40% improvement in the friction pulse height and of the order of 150% improvement in the steady sliding friction.

EXAMPLE IV

Two 20.5–25 cross-ply tires R and S, having nylon carcass plies with a ply rating of 16 were prepared with one and two layers of felt respectively in place of the normal two layer nylon fabric breaker assembly. The felt used comprised wires of 0.15 mm. diameter and had a density of 0.75 kg/m². The felt was calendered on each side with a 2 mm. thick layer of rubber prior to incorporation into the tire and had 13.6% by weight of wire after calendering. The conventional gauge tread strip was applied to the tire resulting in tires having a thicker tread than the standard tire with nylon breaker layers as is given in Table

TABLE VII

| Tire | Tread thickness in excess of the standard tire tread | |
|---|---|---|
|  | Shoulder | Mid-circumferential line |
| R | 8 mm. | 3 mm. |
| S | 10 mm. | 6 mm. |

Tire R, having a single layer of felt, gave a Ton M.P.H. (measure or running temperature characteristics) rating of 10.5% better than the standard tire; and tire S, having a double layer of felt, gave a Ton M.P.H. rating substantially equal to the standard tire. Therefore, it is estimated that at least a 15% advantage in tire running temperature characteristics by using felt in this manner in a tire having the same tread thickness as the standard tire.

Figure 9:
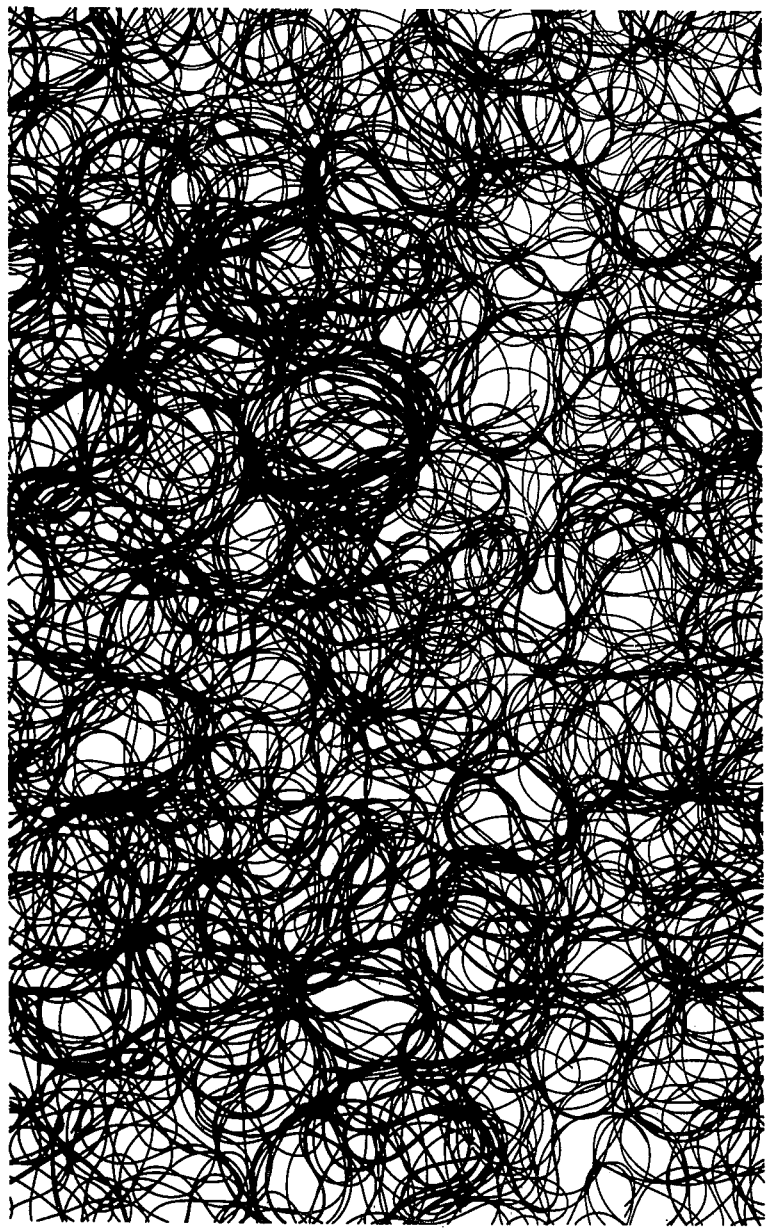
FIGS. 9 and 10 are plan views of the felt.
Figure 10:
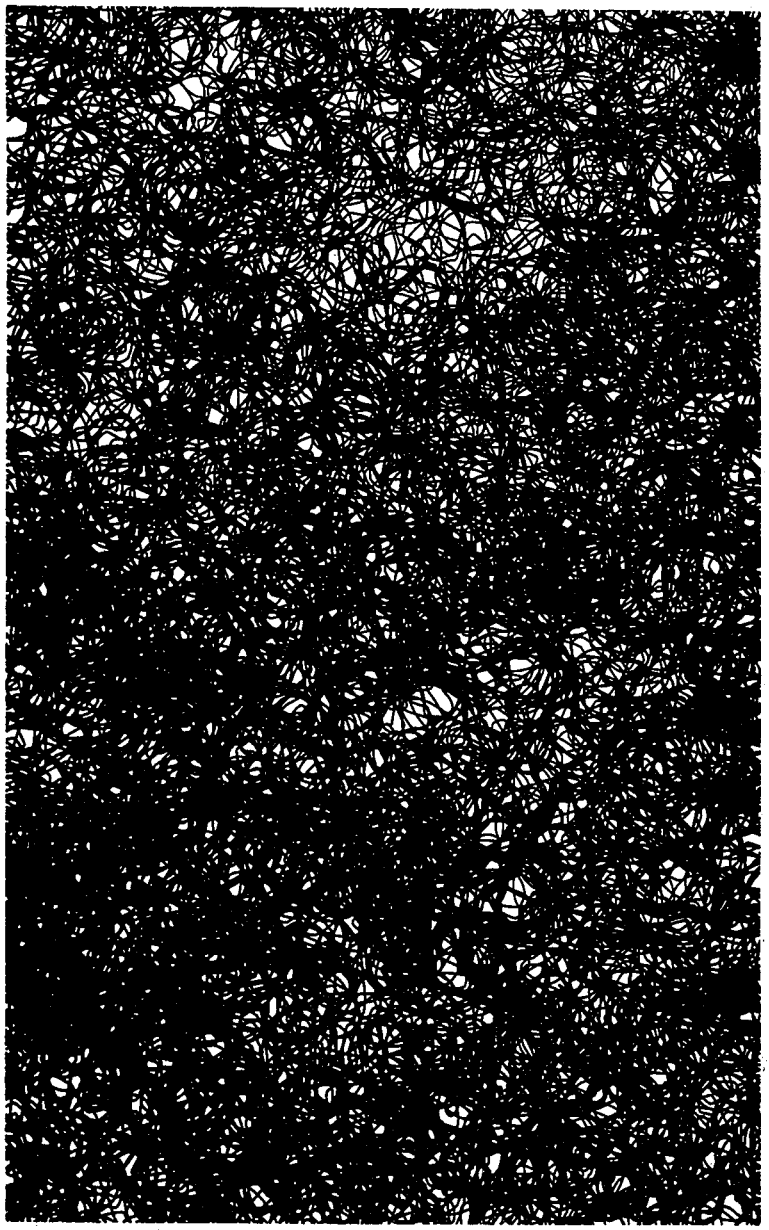

The felt is shown in FIGS. 9 and 10 which are reproductions of X-ray photographs of the felts. FIG. 9 shows a unneedled felt after calendering. This felt is of 0.18 mm wire and of a density of 0.5 kg per square meter. FIG. 10 shows the felt of FIG. 9 after needle-punching, the density of the felt being 0.76 kg per square meter. The felt shown in FIG. 10 is the same as that described above for Tire G in Example II.

Having now described our invention, what we claim is:

1. A pneumatic tire having a tread portion and sidewall portions and comprising a reinforcing layer in at least one of the tread portion and the sidewall portions, said reinforcing layer including at least one metal wire felt, the felt comprising a mat of interpenetrated substantially aligned crimped continuous untensioned metal wires intermingled in three dimensions.

2. A pneumatic tire according to claim 1 wherein the felt comprises steel wires each having a diameter in the range 0.04 mm to 0.71 mm.

3. A pneumatic tire according to claim 1 wherein the felt is needled felt.

4. A pneumatic tire according to claim 1 wherein the felt is a rubberized felt.

5. A pneumatic tire according to claim 4 wherein the weight of the wire in the rubberized felt is no more than 80% of the felt.

6. A pneumatic tire according to claim 1 including a carcass ply extending from one bead region to another wherein the carcass ply comprises a textile cord fabric, the reinforcing layer comprising a breaker layer.

7. A pneumatic tire according to claim 1 including a carcass ply extending from one bead to another wherein the carcass ply comprises a textile cord fabric arranged in cross-ply configuration or radial-ply configuration of a steel cord fabric arranged in radial-ply configuration, the reinforcing layer comprising a sidewall reinforcement.

8. A pneumatic tire according to claim 7 wherein the reinforcing layer in the sidewall comprises a single layer of felt.

9. A pneumatic tire according to claim 8 wherein the layer is disposed radially outwardly of the carcass ply and is positioned adjacent the exterior sidewall surface.

10. A pneumatic tire according to claim 8 wherein the layer is disposed adjacent to and radially outwardly of the carcass ply.

11. A pneumatic tire according to claim 7 wherein the reinforcing layer comprises a plurality of layers of felt forming substantially the whole of the sidewall between the carcass ply and the exterior surface thereof.

12. A pneumatic tire according to claim 8 wherein the layer is disposed on the interior surface of the tire.

13. A pneumatic tire according to claim 8 wherein the carcass ply comprises at least two plies of textile cord fabric between which the layer is disposed.

14. A pneumatic tire according to claim 13 wherein the layer extends into the crown region of the tire.

15. A pneumatic tire according to claim 7 wherein the layer extends radially inwardly from the tire shoulder region to a point disposed radially outwardly of the tire bead base by an amount substantially equal to the radial extent of a rim flange of a wheel on which the tire may be mounted.

16. A pneumatic tire according to claim 7 wherein the layer, layers or folded layer extend a short distance radially inwardly and outwardly of the axially widest point of the tire.

17. A pneumatic tire according to claim 1 wherein the reinforcing layer comprises a tread reinforcing layer.

18. A pneumatic tire according to claim 17 wherein the layer comprises a plurality of layers of felt extending substantially the whole depth of the tread and of a width substantially equal to the axial width of the tread.

19. A pneumatic tire according to claim 1 wherein the reinforcing layer comprises a chafer strip.

20. A pneumatic tire according to claim 1 comprising a carcass ply turned up about bead cores wherein the reinforcing layer comprises a bead filler extending radially inwardly and outwardly of the turned-up portion of the carcass ply.

21. A pneumatic tire according to claim 20 wherein the bead filler is disposed axially outwardly of the carcass ply turn-up portion.

22. A pneumatic tire according to claim 20 wherein the bead filler is disposed axially inwardly of the carcass ply turn-up portion.

23. A pneumatic tire according to claim 20 wherein the bead filled extends radially inwardly sufficiently to be turned around the bead wire.

24. A pneumatic tyre according to claim 1 comprising a carcass ply turned up about bead cores wherein the reinforcing layer comprises a plurality of strips of felt forming a bead apex component.

25. A pneumatic tyre according to claim 1 wherein the felt comprises bunches of wires which have been twisted to form strands prior to crimping.

26. A pneumatic tyre according to claim 25 wherein the felt comprises twisted strands of wire twisted together to form cords prior to crimping.

* * * * *